C. B. BORGESON.
HEDDLE MAKING MACHINE.
APPLICATION FILED MAR. 7, 1908.

923,011.

Patented May 25, 1909.
12 SHEETS—SHEET 1.

Witnesses
H.C. Barry
Edw. W. Byrn

Inventor
CHARLES B. BORGESON
By Attorneys Munn & Co.

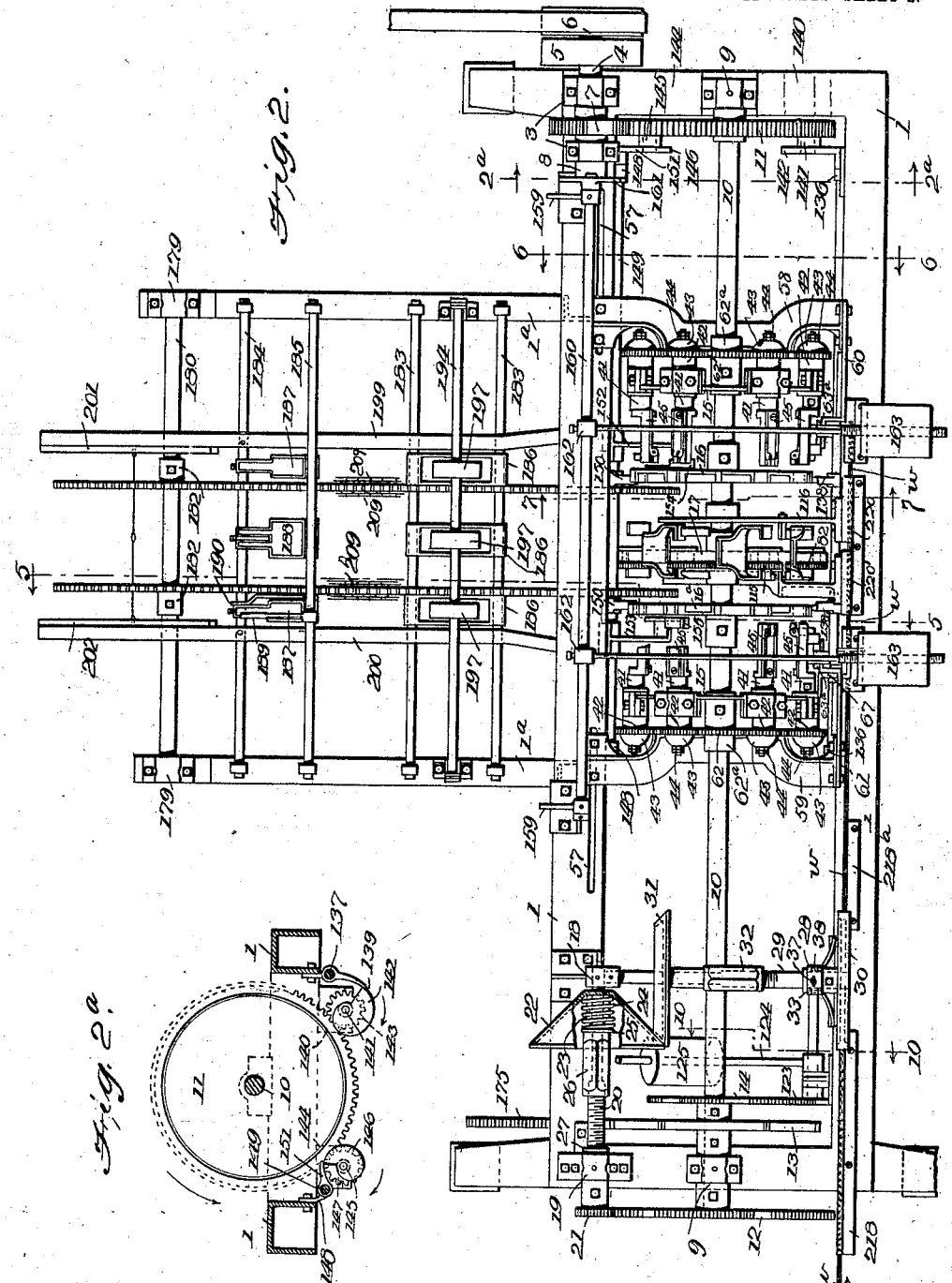

C. B. BORGESON.
HEDDLE MAKING MACHINE.
APPLICATION FILED MAR. 7, 1908.
923,011.
Patented May 25, 1909.
12 SHEETS—SHEET 3.
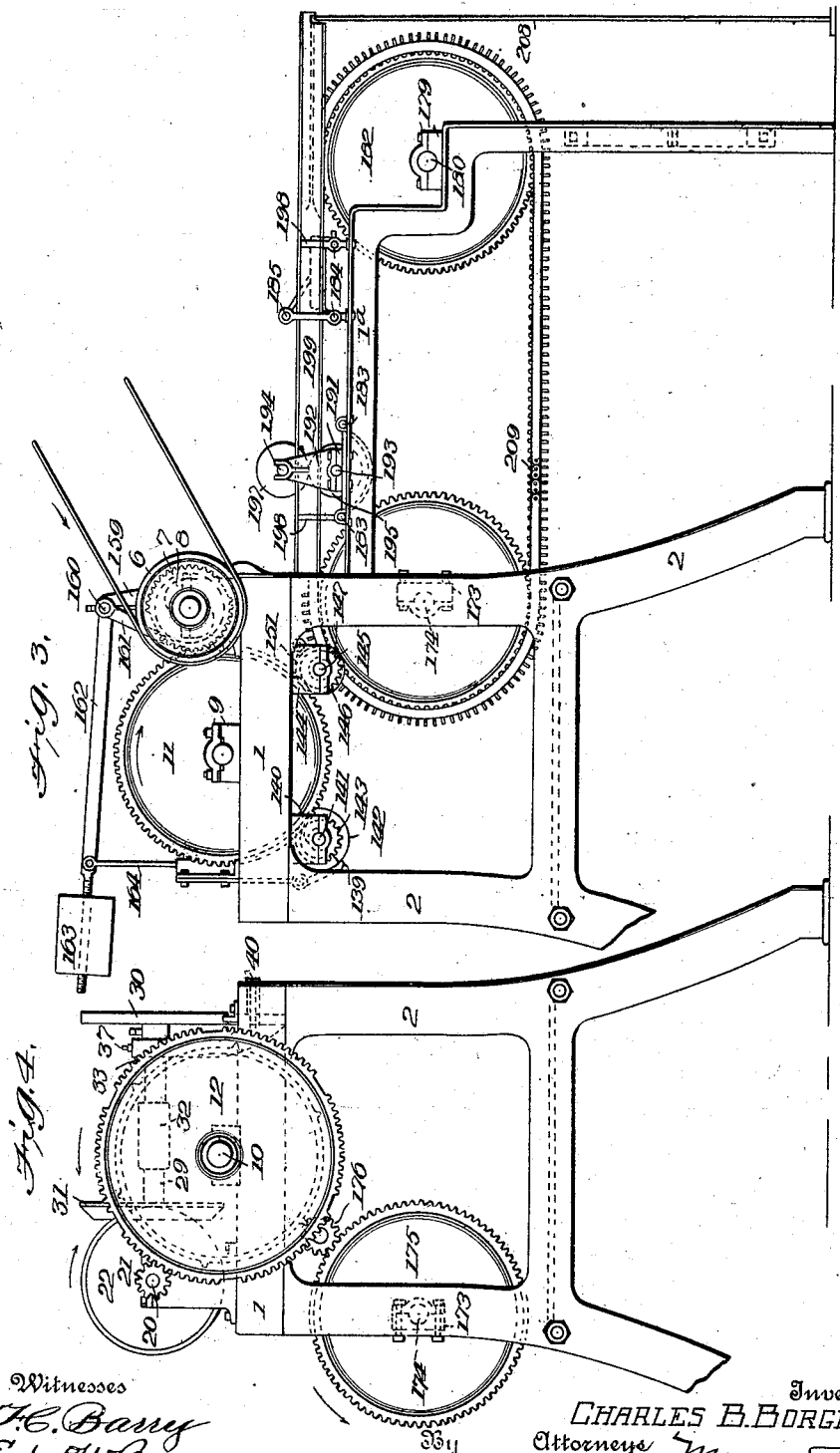

C. B. BORGESON.
HEDDLE MAKING MACHINE.
APPLICATION FILED MAR. 7, 1908.
923,011.
Patented May 25, 1909.
12 SHEETS—SHEET 4.
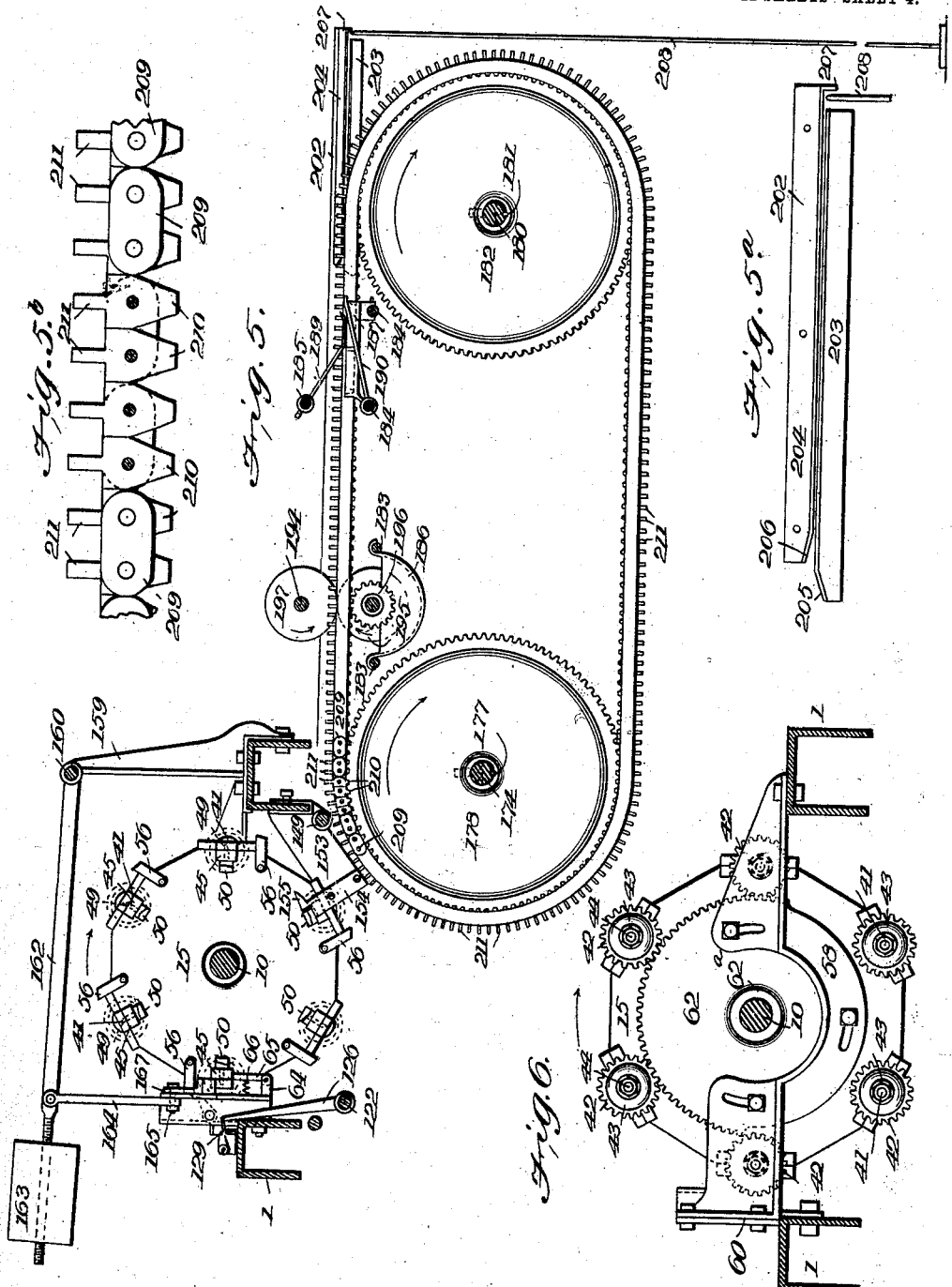
Witnesses
H. C. Barry
Edw. W. Byrn.
Inventor
CHARLES B. BORGESON
By Attorneys Munn & Co.

C. B. BORGESON.
HEDDLE MAKING MACHINE.
APPLICATION FILED MAR. 7, 1908.
923,011.
Patented May 25, 1909.
12 SHEETS—SHEET 5.
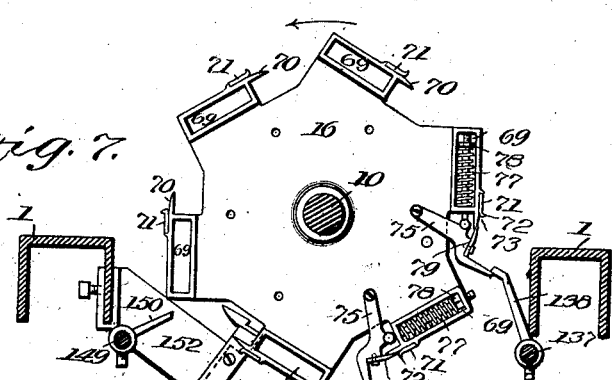
Fig. 7.
Fig. 8ᵃ
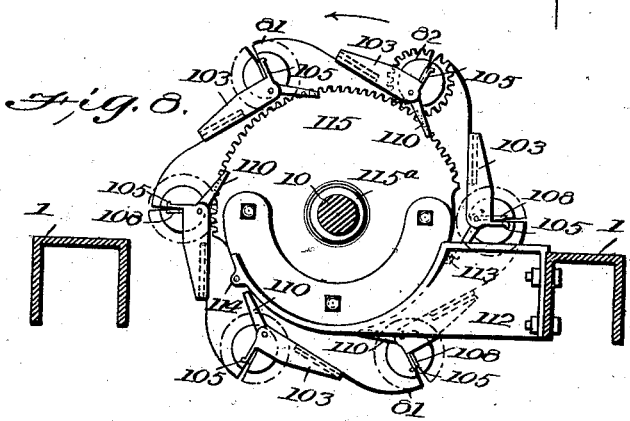
Fig. 8.
Fig. 9.
Witnesses
F. C. Barry
Edw. W. Byrn.
Inventor
CHARLES B. BORGESON
By Attorneys Munn & Co.

C. B. BORGESON.
HEDDLE MAKING MACHINE.
APPLICATION FILED MAR. 7, 1908.
923,011.
Patented May 25, 1909.
12 SHEETS—SHEET 6.
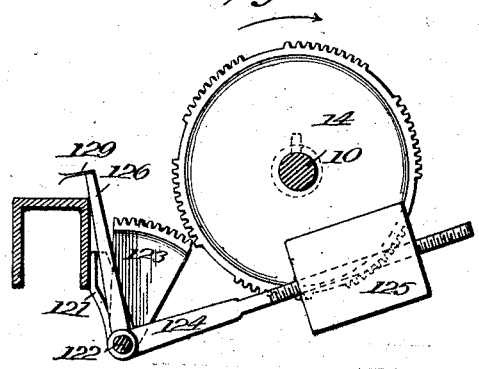
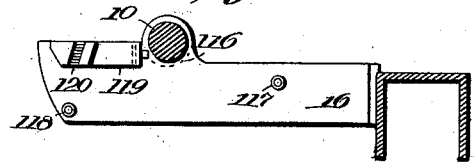
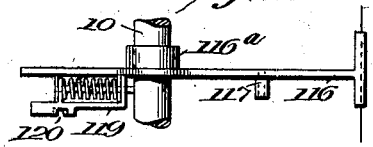
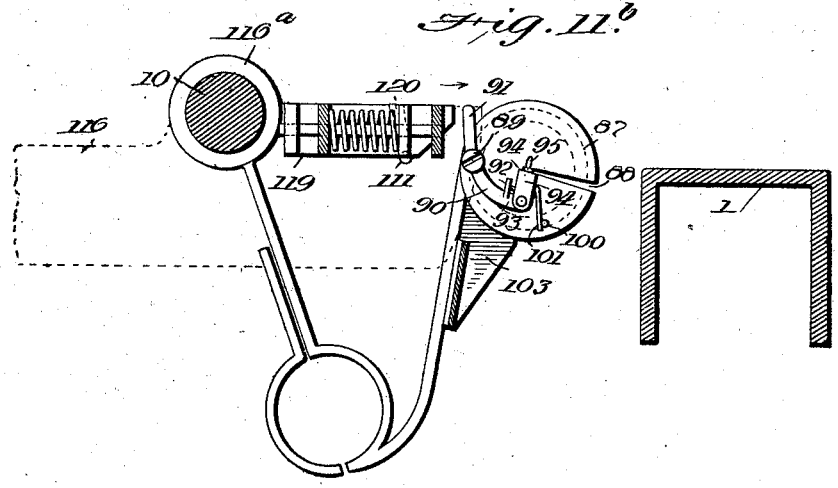
Witnesses
F. C. Barry
Edw. W. Byrn
Inventor
CHARLES B. BORGESON
By Attorneys
Munn & Co.

C. B. BORGESON.
HEDDLE MAKING MACHINE.
APPLICATION FILED MAR. 7, 1908.
923,011.
Patented May 25, 1909.
12 SHEETS—SHEET 7.
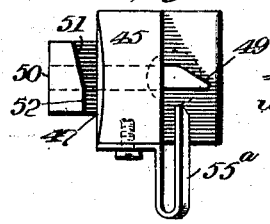
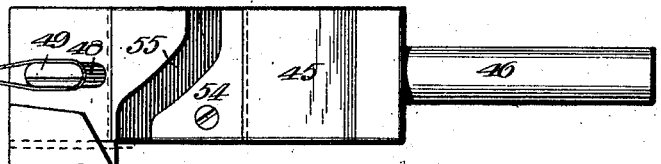
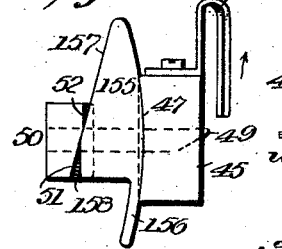
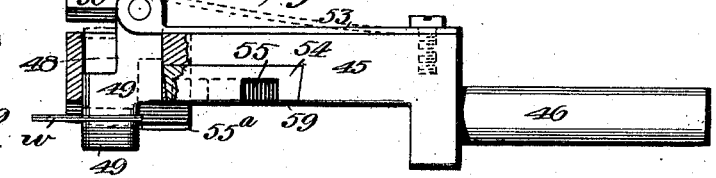
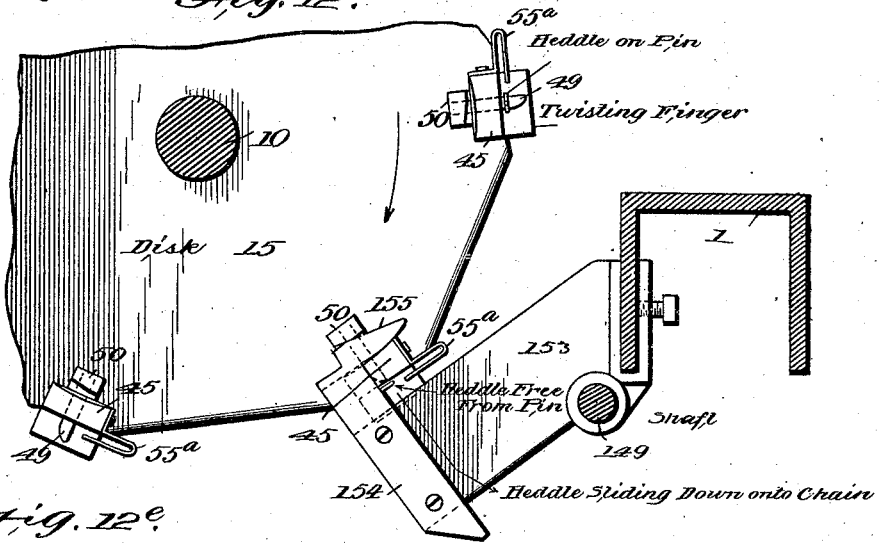
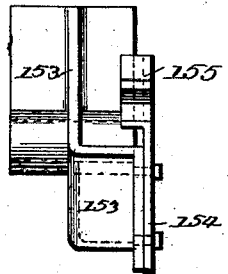
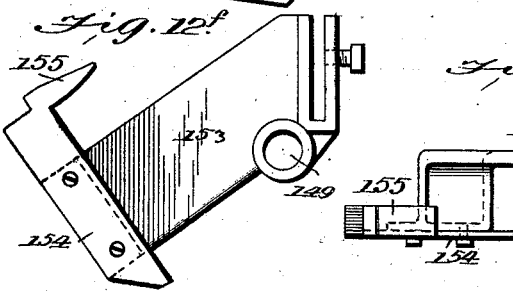
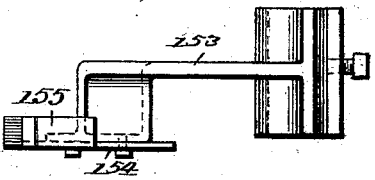
Witnesses
F. C. Barry
Edw. W. Byrn
Inventor
CHARLES B. BORGESON
By Attorneys
Munn & Co.

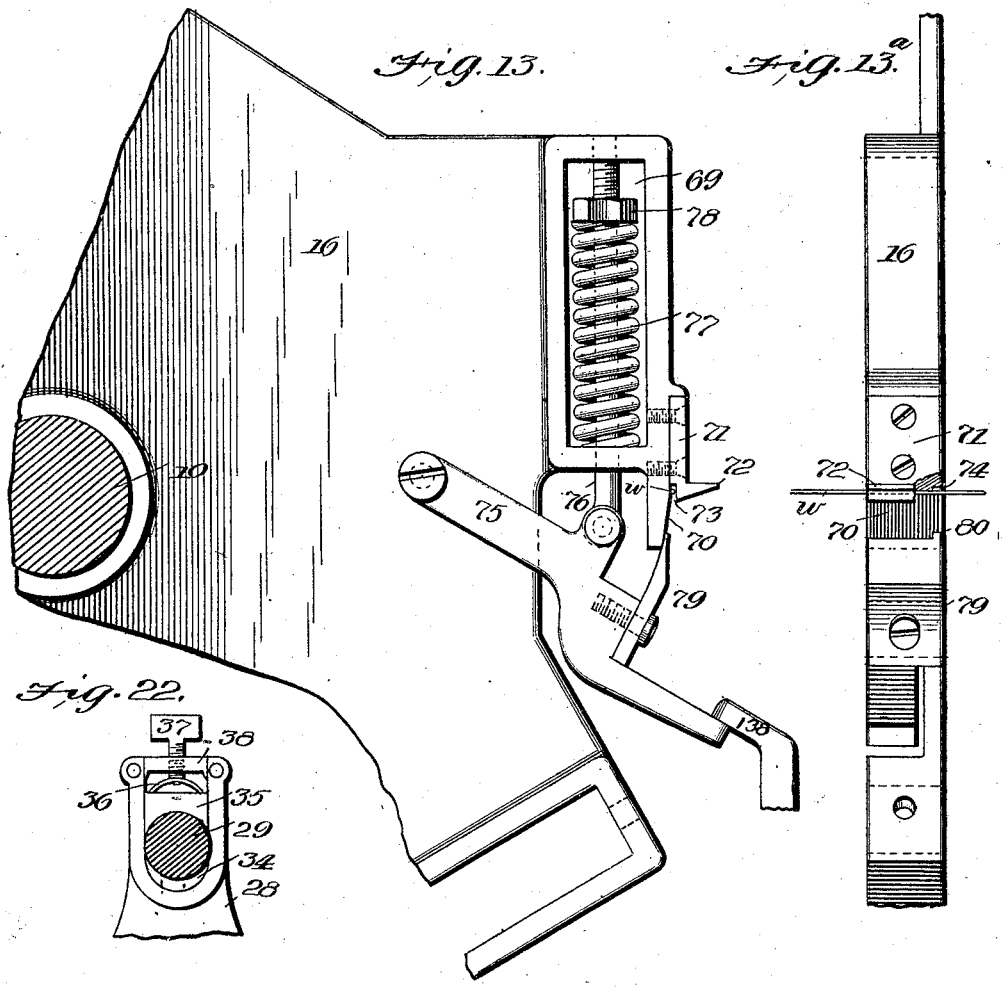

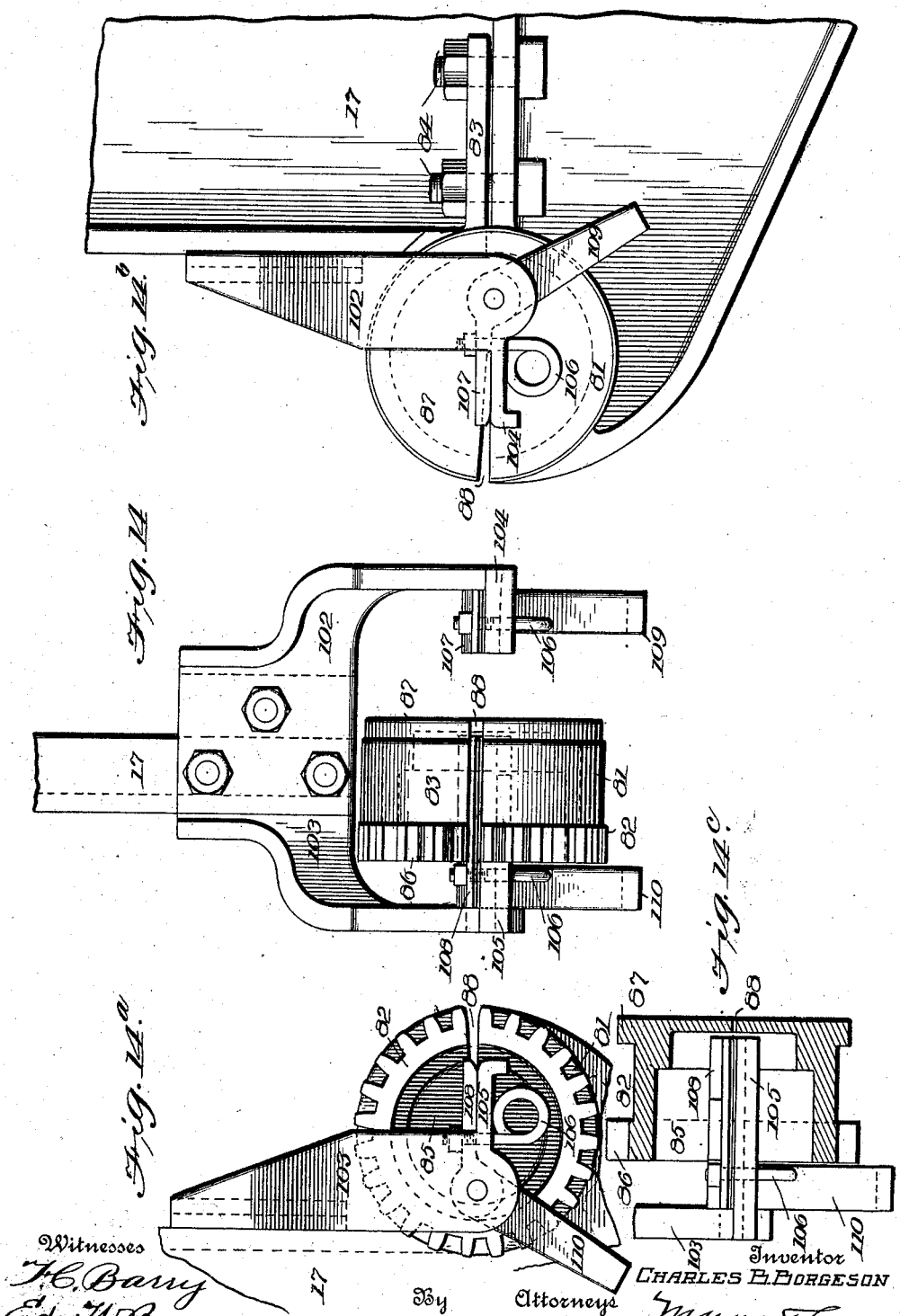

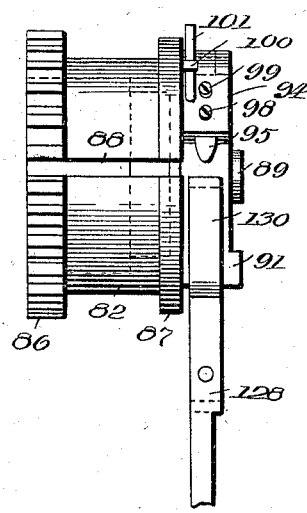
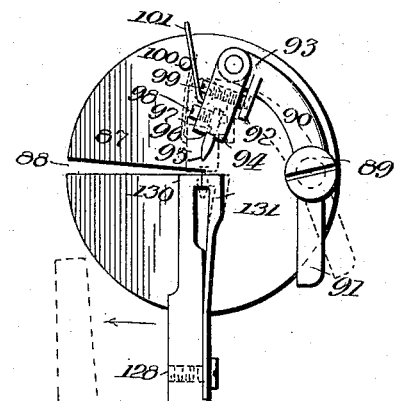
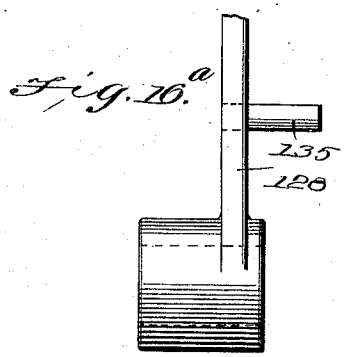

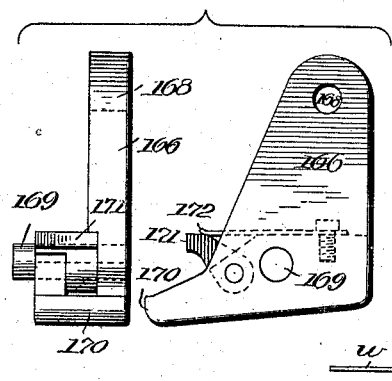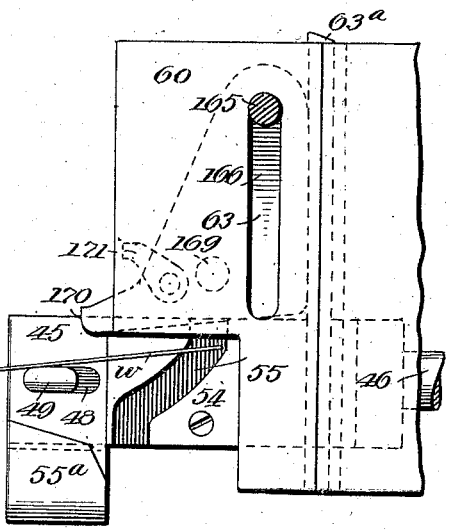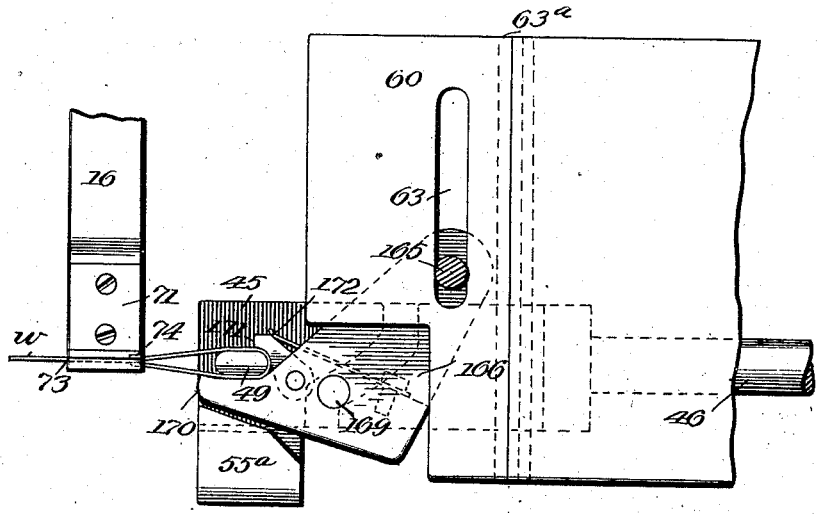

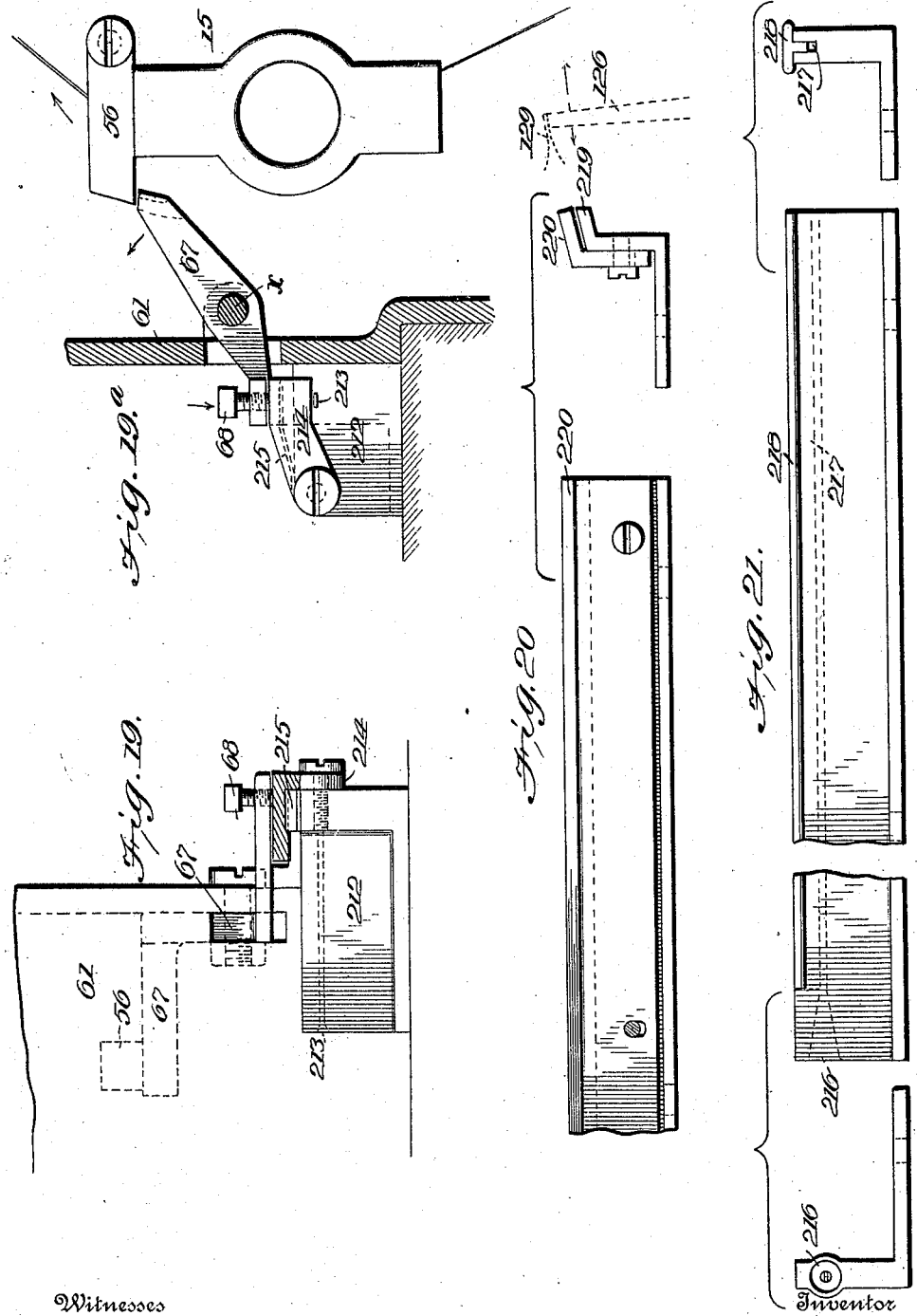

UNITED STATES PATENT OFFICE.

CHARLES BEN BORGESON, OF BUTLER, PENNSYLVANIA.

HEDDLE-MAKING MACHINE.

No. 923,011.     Specification of Letters Patent.     Patented May 25, 1909.

Application filed March 7, 1908. Serial No. 419,720.

*To all whom it may concern:*

Be it known that I, CHARLES BEN BORGESON, a citizen of the United States, residing at Butler, in the county of Butler, State of Pennsylvania, have invented a new and useful Improvement in Heddle-Making Machines, of which the following is a specification.

My invention relates to a machine for making loom-heddles of a duplex wire composed of two parallel strands soldered together continuously throughout their length; and the object of my invention is to provide an automatic power-driven machine, which is simple of construction, easy to keep in working order, and of great capacity.

A further object of my invention is to, by a series of manipulations, produce—free from any roughness which would injure the warp-threads of the loom—finished heddles, which are threaded onto two rods, from which the heddles may easily and quickly be transferred to other rods or cords. This will save much time and work in getting the heddles ready for shipment, and also in stringing them on a loom harness.

To these ends my invention consists of the parts and combinations of parts, as hereinafter described, and more particularly pointed out in the claims at the end of this specification.

Referring to the annexed drawings, Figure 1 is a front elevation of the complete machine. Fig. 2 is a top plan view. Fig. $2^a$ is a cross-sectional detail on line $2^a$, $2^a$, of Fig. 2. Fig. 3 is a right hand end elevation, and Fig. 4 a partial left hand end elevation. Fig. 5 is a vertical cross-section on line 5—5 of Fig. 2. Fig. $5^a$ is an enlarged view of the heddle storing or stringing device, and Fig. $5^b$ a detail of the heddle chain. Fig. 6 is a vertical cross-section on line 6—6 of Fig. 2. Fig. 7 is a vertical cross-section on line 7—7 of Fig 2. Figs. 8, $8^a$ and 9 are views of the central part of the rotary wire carrier, Figs. 8 and 9 being views from opposite sides, and Fig. $8^a$ a top view of the toothed semi-circular plate. Fig. 10 is a vertical cross-section partly on line 10—10 of Fig. 2. Figs. 11, $11^a$ and $11^b$ are views of the releasing devices for removing the punch from the center eye of the heddle. Figs. 12, $12^a$ and $12^b$ are front, sectional plan and end views of a twisting finger. Figs. $12^c$, $12^d$, $12^e$, $12^f$ and $12^g$ are views showing devices for releasing the heddle loops from the twisting fingers. Figs. 13 and $13^a$ are enlarged side and edge views of a clamping disk for holding the ends of the heddle wires. Figs. 14, $14^a$ and $14^b$ are detail views of the front and opposite sides of a central disk carrying the central twisting pinions and forks supporting the wire clamping devices. Fig. $14^c$ is a section through the pinion. Figs. 15 and $15^a$ are views at right angles to each other of the central twisting pinions and their pivoted punches for opening the central eye of the heddle. Figs. 16 and $16^a$ are views of the lower parts of an anvil which supports the heddle wire, while the punch presses itself between the two strands of the heddle wire to form the central eye. Fig. 17 shows side and edge views of the die which bends around the ends of the wire to produce the end loops of the heddle. Fig. 18 shows the heddle wire in position in relation to the die and coacting parts to form the heddle loop. Fig. $18^a$ shows the same parts with the bending completed, and the end of the wire ready to be clamped before twisting commences. Figs. 19 and $19^a$ are front and side views of the wire cutting device. Fig. 20 represents a front and end view of a part of the central wire guide. Fig. 21 represents front and opposite end views showing the construction of the first guide through which the wire enters. Fig. 22 shows a spring seated journal for the axle carrying the wire feed wheel. Fig. 23 is a piece of the duplex heddle wire from which the heddles are made. Fig. 24 is a partly completed heddle, and Fig. 25 shows a finished heddle threaded onto the storage rods 208.

In a complex machine like this, it will be helpful to a clear understanding, to give first a brief description of its general construction and operation before going into its details of construction.

Referring to Fig. 2, which shows a plan view of the entire machine, it will be seen that the general shape of the main frame is an elongated rectangle with an offset from its middle projecting at right angles. On the front rectangular portion are performed the operations of feeding and cutting off the wire into suitable lengths, punching a central warp thread eye in the same, and forming loops at the ends of the cut off section and twisting the duplex wire on each side of the central eye and at the end loops. These operations being completed the formed heddles are delivered to the rear offsetting portion of the machine, where they are received on endless carrying chains and are successively carried by the chains through a chemical flux bath and a soldering bath to solder the twisted portions of the wire, and the heddles are then automatically strung, by their end loops, upon storage rods for convenient storage and adjustment to the harness of the loom. The wire feeding devices are seen on the left hand end of Figs. 1 and 2 where a cone friction feed drives the wire feed wheels operating upon the wire $w$, the cone feed being adjusted as to speed and the gears for driving the same being formed as hereafter described with blank spaces to give an intermittent feed which stops long enough to permit the cutting off operation to take place. The cut off lengths of wire are successively fed to a rotary carrier supporting punching and twisting apparatus mounted on a shaft parallel to the feed of the wire, and which punching and twisting apparatus takes a continuous succession of wire sections in parallel positions to each other and carries them laterally, or at right angles to their length, toward the rear over a circular path, during which travel all the punching and bending operations are successively performed on the wires and the heddles delivered in a continuous series to the soldering apparatus in the rear. It is the lateral travel of the wires in their rotary carrier which is made to perform successively the several twisting operations and in this way a plurality of wires are being acted on at the same time, which greatly increases the efficiency and capacity of the machine. With this general description, I will now proceed to a detailed description of the construction and arrangement of the various parts.

Referring to the drawings, Figs. 1, 2, 3, 4, the numeral 1 designates a frame supported by legs 2. On the frame is mounted the bearings 3 (Fig. 2) supporting the axle 4, which carries the tight and loose pulleys 5 and 6, the driving pinion 7 and the cam 8, Fig. 3. Two bearings 9 (Fig. 2) support shaft 10, to which are secured the driven wheels 11, at one end and the gear wheels 12, 13 and 14 at the other end, and disks 15, 16, 16$^a$ and 17 in the middle. Supported by bracket 18 and bearing 19 is a shaft 20 on which is fixed pinion 21 and the longitudinally adjustable driving cone 22, provided with a hub 23 around which is wound a spring 24, bearing against the cone and washer 25, which latter is pressed against the spring by the adjustable screw nut 26. Against the journal box 19 bears a collar 27 on the shaft. This shaft is threaded to allow cone 22 an adjustment for change of speed, when change of wire feed is wanted. Shaft 20 has a key—not shown—which causes cone 22 to revolve rigidly with the shaft. In brackets 18 and 28 is journaled a transverse shaft 29, on the end of which is fixed the wire feed-wheel 30 and the longitudinally adjustable friction cone 31, against which presses the nut 32. Shaft 29 has a collar 33 bearing against bracket 28 and said shaft 29 is threaded to allow adjustment of the cone 31, when different wire feed is wanted. This cone 31 also has a key—not shown—which causes the cone to revolve with the shaft. The bracket 28, see detail Fig. 22, has an opening 34 in which turns shaft 29 against which bears block 35 pressed down by spring 36 operated by thumb screw 37 working in detachable bridge piece 38. Thus can the feed wheel 30 be made to press properly on the wire passing between it and the subjacent friction roller 39 (see Fig. 1) revolving on a pin 40 mounted in the frame as shown.

I will now describe the devices in the middle of the machine for successively carrying the wire section laterally to the rear and forming the eye and end loops. In the periphery of the two disks 15, see Figs. 1, 2, 5 and 6, are journaled the shafts 41, each of which at one end carries a geared pinion 42 and a spring disk 43; (helical springs can be used instead of spring disk) which spring disks are pressed against the pinion by nuts 44. At the other end of each shaft is mounted the twisting finger 45, see Figs. 1, 2, 5, 12, 12$^a$ and 12$^b$, provided with a shank 46, a circular recess 47 and a hole 48 through which passes a flattened pin 49 provided with a rigid head 50 having bearing surfaces 51 and 52. The pin 49 is pivoted to the spring 53 secured to 45. In the twisting finger is inserted a plate 54 provided with a cam groove 55. To the twisting finger is fixed a wire guide 55$^a$. To one disk 15 are fixed levers 56, see Figs. 5, 19 and 19$^a$. Frame 1 has slots 56$^a$ and 57, see Figs. 1 and 2 to provide for lateral adjustment of bridges 58 and 59 and their attached plates 60 and 61, see Figs. 1, 2, 5 and 6. To the bridges 58 and 59 are fixed the disks 62 provided with teeth to turn pinions 42 two or three revolutions. The disks have central hubs 62$^a$ in which the main axle 10 can turn freely. Plate 60 has a slot 63, (Fig. 18), a rib 63$^a$, and a projection 64 (Fig. 5) to which is pivoted a lever 65 controlled by a spring 66. Plate 61 has the same arrangement, and besides to it is pivoted a bell crank lever 67, see Figs. 1, 2, 19 and 19$^a$, provided with an adjustment screw 68. Disks 16 and 16$^a$, which are the reverse of each other, see Figs. 1, 2, 7, 13 and 13$^a$, have around the periphery elongated openings 69 and guides 70 (Fig. 13) to which are fixed the wire clamping dies 71, which are provided with a wire guide 72, and a seat 73, fitting the heddle wire and with an offset 74, Fig. 13$^a$ to produce an offset in the wire and cause the end of the wire to be even with the main stem of the heddle, as shown in Figs. 24 and 25. Pivoted to disks 16 and 16$^a$ are levers 75 (Fig. 13) to which are connected rods 76 passing through springs 77 and provided with nuts 78. To the levers are fixed the wire clamping dies 79 which swing along guides 70 and enter the die 71, and have an offset 80 (Fig. 13ª) corresponding to and operating with offset 74.

The central disk 17, see Figs. 1, 2, 8, 9, 14, 14ª and 14ᵇ, has on its periphery semicircular seats 81 Fig. 14ª which serve as supports and bearings for geared pinions 82 which are held in place by semicircular pieces 83 fixed to the disk flanges by bolts 84. The pinions 82 are hollowed out at 85 (Fig. 14ᶜ), and have teeth 86 at one end and flanges 87 at the other which are provided with radial slits 88 for the reception of the heddle wire. On the flanges 87, see Figs. 15 and 15ª, are pivoted by studs 89, levers 90 provided with tails 91, flanges 92 and heads 93 to which latter are pivoted pieces 94, in which punches 95 are held in place by a slot 96, a hole 97 and a set screw 98. A set screw 99, passing through 94 and 92, serves to adjust the punch. To flange 87 is fixed a stud 100 against which bears a spring 101 fixed to piece 94, and intended to keep piece 94 in any position as lever 90 turns on its center 89. Fixed to the disk 17, see Figs. 14, 14ª and 14ᵇ, and straddling pinions 82 are fork pieces 102 and 103, of which each forms at its lower part a fixed jaw 104 and 105, against which springs 106 press the pivoted jaws 107 and 108 provided with tails 109 and 110. The jaws 105 and 108 extend into the hollow part 85 of the pinion as seen in Fig. 14ᶜ. To disk 17 are also fixed studs 111, (Fig. 9). The bracket 112, see Figs. 8 and 8ª, supports rollers 113 and 114 and fixed to the bracket is the disk 115, which is provided with teeth to turn the pinions 82 two or three revolutions. The disk 115 has a central hub 115ª which serves as a bearing on shaft 10. The bracket 116, see Figs. 2, 11 and 11ª, with its hub 116ª, in which shaft 10 turns freely, supports rollers 117 and 118 and carries on flanges a spring actuated bolt 119 provided with a transverse groove 120 in it.

Secured to the frame (see Fig. 1) are two or more brackets 121, which support and journal the horizontal shaft 122 on which, see Figs. 1, 2, 5, 9, 10, 16 and 16ª, are fixed a toothed sector 123 (Fig. 10) and a lever 124 supporting an adjustable weight 125. The shaft 122 also supports and oscillates levers 126, 127, and 128 (Figs. 10 and 16). Levers 126 and 127, which are fixed to the shaft by set screws, have spring jaws 129 for gripping the wire and transferring it into the slot of the central pinion 82 and on top of pins 49 (Fig. 18). Lever 128 (Figs. 1 and 16) which swings free on shaft 122, is provided at its upper end with a jaw 130 against which presses a spring jaw 131. Both jaws will act as an anvil for the wire which lies in the slot 88 of the pinion at the joint between the jaws 130 and 131, and these jaws separate to admit punch 95 after it has forced its way between the two members of the duplex wire. A spring 132 and an arm 133, provided with a thumb screw 134 bearing against the frame 1, serve to operate and adjust the lever 70.

As the pinions revolve about the main axle 10, it is necessary at intervals to get the anvil parts out of the way of the pinions to let them pass. For this purpose the lever 128 is rocked forward out of the swing of pinion 82 and its punching device by the fixed stud 135, against which presses the lever 127 in its forward swing, as shown in dotted lines in Figs. 1 and 16. Two brackets 136 support shaft 137, which operates levers 138 and 139 (Figs. 1, 2, 3, 7 and 13). Journal 140 Figs. 2 and 2ª supports a short shaft 141 on which is mounted a cam 142, acting on lever 139. A pinion 143 Fig. 1 on shaft 141 meshes with wheel 11 and is of a size to make either 6 or 3 revolutions to each turn of wheel 11.

A bearing 144 (Figs. 2, 2ª and 3) supports a short shaft 145 on which are mounted a cam 146 and a pinion 147 meshing with wheel 11 and of a size to make either 6 or 3 revolutions to each turn of wheel 11. The 6 or 3 revolutions of pinions 143 and 147 to each turn of wheel 11, refers only to a machine carrying 6 sets of twisting pinions. Any other number of twisters require different proportional speed. Two brackets 148 (Figs. 2 and 2ª) support shaft 149 which operates levers 150 and 151 against which latter presses the cam 146. Adjustably supported on the shaft 149 and clamped to the frame, see Figs. 2, 5 and 7, are the pieces 152 and 153 to which are fixed the release pieces 154 and 155 (Figs. 5, 7, and 12ᵈ.) These pieces, see Figs. 5, 7 12ᶜ, 12ᵈ, 12ᵉ, 12ᶠ and 12ᵍ have an offset head, provided with circular surfaces 156 Fig. 12 and surfaces 157 and 158, all surfaces corresponding to surfaces 47, 51 and 52 on the twisting finger and pin.

Two or more standards 159 (Figs. 2 and 5) serve as supports and journals for shaft 160 on which is fixed lever 161 (Fig. 3) and two movable levers 162, carrying movable weights 163. To the levers are pivoted rods 164 carrying at their lower ends bolts 165 (Fig. 5) which pass through slots 63 (Figs. 1 and 18) in plates 60 and 61, and support the bending dies 166 and 167. These bending dies, see Fig. 17, which are the reverse of each other, have a hole 168, through which passes the bolt 165 (Fig. 5), a fixed stud 169, a toe 170 and a pivoted hook 171 held by a spring 172.

Two bearings 173 (Figs. 1, 3, 4) support shaft 174 on which is fixed wheel 175 between which and wheel 13 meshes a pinion 176 (Fig. 4). The shaft 174 is provided with a key 177 to keep in alinement the movable wheels 178, see Figs. 1 and 5. To frame 1 (Figs. 2 and 3) is fixed the frame 1ª projecting in the rear at right angles to frame 1 and supporting and containing the soldering and transfer devices. Two journals 179 Figs. 2 and 3 support a shaft 180 provided with a key 181 (Fig. 5), to keep the movable wheels 182 in alinement. On frame 1ª are by suitable devices supported and fixed the parallel and transverse rods 183, 184 and 185. The rods 183 support movable troughs 186, Figs. 2, 3 and 5, which are to contain either soldering acid or paste. On the rods 184 are supported small, movable basins 187 and 188 in which solder is to be kept in a molten state by any suitable method, as lamps, electric heaters or the like. To rods 184 and 185 are fixed fingers 189 and 190 (shown in Fig. 2, at one place only) of which the fingers 189 press down the heddles and cause them to slide a short distance through the solder, whereafter the heddles will ride up on 190 and leave the solder as finished heddles. A bearing 191 Fig. 3 and standard 192 support and journal shafts 193 and 194. On shaft 193 are mounted three rollers 195 and a pinion 196, Fig. 5. Shaft 194 carries three rollers 197, Fig. 2, rotating on and pressing against top of rollers 195, Fig. 5. On rods 183 and 184 (Fig. 3) slide uprights 198, supporting heddle guides 199 and 200 to which are attached small parallel guides 201 and 202, Figs. 2 and 5ª. These small guides, see Fig. 5ª, have a bottom piece 203 and a top piece 204. The bottom piece has an incline 205 which turns the heddle loops to a horizontal position, so they will pass between the guides. The top piece, which is adjustable to suit different wires, has at one end an incline 206 and at the other end a downwardly projecting lip 207 which stops the heddles and causes them to be threaded up on two vertical rods 208, which rods respectively enter the two loops at the end of each heddle. These rods can be arranged in several pairs in a suitable device, so that when one pair of rods is filled up with heddles, the next pair of rods may be moved into proper place. The wheels 178 and 182 and pinion 196 (Figs. 5 and 5ᵇ) are operated by a chain consisting of links 209 between which are pivoted studs shaped at one end 210 to mesh with the wheels and pinion, and at the other end provided with a finger 211, which pushes along the heddles.

The wire cutting-off device (see Figs. 1, 19, and 19ª) consists of a block 212 provided with a hole 213 for the passage of the wire. To said block is hinged the knife 214 which is kept suspended above hole 213 by a spring 215. The cut-off action is as follows: the disk 15 swings around in the direction indicated by the arrow and presses its fixed lever 56 against an offset of the lever 67, which turns on its pivot $x$ and presses down the knife 214, severing the wire. The end wire guide, (Figs. 1, 2 and 21) is provided with a hole 216 and a slot 217 in which fits a cover 218 and 218ª leaving a channel for the passage of the wire, as clearly shown. The central wire guide (see Fig. 20) has a flange 219 inclined to suit the upward swing of the gripping fingers 129 (Fig. 10) and the top 220 (Fig. 20) is adjustable to suit different wires and prevent their turning around in the slot formed by the guide. The position of these latter guides is shown at 220′ in Fig. 2.

The machine shows six sets of twisters, but any suitable number of sets may be mounted and operated in the same way. All parts in the machine are easy to get at and may be readily adjusted to form heddles of different lengths.

I am aware that many changes may be made by those who are skilled in the art in the construction of my heddle-machine, using certain parts in different locations and combinations and omitting some parts, without departing from the scope of my invention as expressed in my claims. I do not wish, therefore, that the broad claims which I make herein should be at all limited to specific details of construction.

Operation: I will now explain the various operations of my machine, by which a heddle wire is converted into a finished heddle. The driving pinion 7 turns the wheel 11 and shaft 10 with its several disks and wheels, of which wheel 12 intermittently turns pinion 21 and friction cone 22, which rotates cone 31 and feed wheel 30 causing the heddle wire $w$ to slide through the guides 218, 218ª and 220. Now the wheel 12 has six toothed parts, each of them sufficient to rotate the pinion 21 one turn, after which it comes to a rest and stops the wire feed, on account of the blank or non-toothed parts of wheel 12. While the wire feeding progresses, the wheel 14, Fig. 10, rotates the sector 123 and swings forward levers 126 and 127 (Fig. 9) until when the wire stops it is gripped by the spring jaws 129. The axle 10 continues to revolve and brings disk 15 (Figs. 2, 5, 19, 19ª) with tappet arm 56 to bear against the lever 67 which presses down the knife 214 and cuts the wire to the proper length for a heddle. At this moment disks 16, 16ª and 17 with their several devices have swung into position for springs 66 (Fig. 5) to press levers 65 under the twisting fingers 45, to hold them and prevent their displacement; one of the blank or untoothed spaces on wheel 14 (Fig. 10) releases sector 123 and allows the lever 124 with its attached weight 125 to turn the shaft 122 and rock lever 126 and 127 (Fig. 9) backward. This brings the wire into the slot of central pinion 82 and between the jaws 104 and 107 (Figs. 14, and 14ᵇ) and 105 and 108 (Fig. 14ª) and at the same time each wire end is slid on top of loop-forming pins 49 (Fig. 18) and is slipped into die openings 73 (Figs. 13 and 18). While the fingers still hold the wire, the lever 127, Fig. 9, hits the tail 91, Fig.

15ª, and rocks the lever 90, until the punch 95 presses between the two members of the duplex wires and separates the subjacent jaws 130 and 131, which act as an anvil. At this moment the cam 8 (Figs. 2 and 3) releases the lever 161 and allows the shaft 160, Fig. 5, to turn. The weights 163 will now press down the levers 162 operating the bending dies 166 and 167, Figs. 1, 17 and 18, and bend the wire around the pins 49, as shown in Fig. 18ª. During the entrance and bending of the wire, the shaft 10 has been at rest on account of pinion 7, Figs. 2 and 3, having two blank or non-toothed spaces. The pinion 7 has two toothed sections between the blank spaces each turning the wheel 11 one-sixth of a revolution; but the blank space having swung past, the pinion 7 again starts the wheel 11, turning the pinion 143 (Fig. 3) and disengaging cam 142 from lever 139 (Fig. 2ª) which controls shaft 137 and levers 138 (Fig. 7). The lever 139 being free, the levers 138 (which have pressed against levers 75 and held dies 79 (Fig. 13) out of the way of the wire) now swing back, and, actuated by springs 77, the levers 75 swing and press the dies 79 against the wire, thus clamping it for twisting the heddles. At the same time the disks 16, 16ª and 17 (Fig. 2) have swung slightly up and the clamping jaw tails 109 and 110, (Figs. 14ª and 14ᵇ) have become disengaged from rollers 117 and 113 (Figs. 8 and 11ª) by which they were heretofore pressed in to open jaws 107 and 108 for the entrance of the wire. The wire being clamped at the end loops and on both sides of the center eye, it is ready for twisting, which is accomplished by the central pinion 82 and end pinions 42 engaging with the geared portions of disks 115 and 62, Figs. 6 and 8, which turn the pinions two or three revolutions.

When the twisting is done, the stud 111, Fig. 9, on disk 17 swings into groove 120, Figs. 11, 11ª and 11ᵇ and presses back spring bolt 119 which, after a certain swing of stud 111, is released and gives a smart blow to tail 91, Fig. 11ᵇ, and swings punch 95 out of the central heddle eye which has been formed. Now the rollers 114 and 118, Figs. 8 and 11, engage the tails 110 and 109, Figs. 14, 14ª, 14ᵇ and press open the jaws 108 and 107. At the same time levers 150, Fig. 7, engage levers 75 swinging out dies 79, Fig. 13, while, (Figs. 12, 12ª, 12ᵇ, 12ᶜ), the part 47 of the twisting fingers and the part 50 of their pins straddle the cam heads 155 Fig. 12ᶜ of pieces 152 and 153, Fig. 2, withdrawing the pins 49, Figs. 12ᶜ, and 18ª from the heddle loops and the heddle, coming in contact with the inclined faces of release pieces 152 and 153, Figs. 5, 7 and 12ᵈ the heddle is pressed out of die 73, Fig. 13, and slides down onto the transfer chain 211. The circular face 156, Fig. 12ᶜ, fits the circular recess 47 and prevents the twisting finger from turning on its own axis during the time the pin 49 is being withdrawn from the heddle loops by the pressure of planes 157 and 158 against planes 51 and 52. When the heddle is free, the cam 146, (Figs. 2, 2ª and 3) disengages lever 151 which controls shaft 149 and allows the levers 150, Fig. 7, to clear levers 75 which swing back to their normal or closed positions, to be opened again by contact with levers 138, Fig. 13. Carried by the transfer chains the heddle passes between the rollers 195 and 197, Figs. 2 and 5, which treat it with acid or soldering paste at the twisted places where solder is to be applied, and then it passes to the solder basin, where the fingers 189 cause the heddle to slide through the solder for some distance, and it then rides up on the fingers 190 and leaves the solder. The heddle is now finished and is carried along in guides 201, 202, 203, and 204 in which it slides until it stops against lips 207 and its loops are threaded onto rods 208, as seen in Figs. 5 and 25. The heddle is shortened slightly during the twisting process and would break if no precaution were taken to prevent it. Now the spring disks 43 at the ends of the twisting pinions (Fig. 2) compensate for said shortening of the heddle by allowing a slight longitudinal movement of the shafts 41 which carry the twisting fingers. Said shafts are provided with a small key sliding in a keyway cut in the pinions.

I claim—

1. A heddle making machine, comprising a series of rotary carriers for gripping and moving the wire sections at right angles to their length, said carriers being provided with central devices for punching the duplex wire and twisting the same to form the central eye, which devices are mounted on the carriers and travel with the wire in a direction at right angles to its length during the twisting operation.

2. A heddle making machine, comprising a series of rotary carriers for gripping and moving the wire sections at right angles to their length, said carriers being provided with central devices for punching the duplex wire and twisting the same to form the central eye, which devices are mounted on the carriers and travel with the wire in a direction at right angles to its length during the twisting operation, and means mounted on the carriers for holding the wire.

3. A heddle making machine, comprising a series of rotary carriers for gripping and moving the wire sections at right angles to their length, said carriers being provided at two points with devices for bending and twisting the terminal loops for the heddles, which devices are mounted on the carriers and travel with the wire in a direction at right angles to its length during the twisting operation.

4. A heddle making machine, comprising a series of rotary carriers for gripping and moving the wire sections at right angles to their length, said carriers being provided at two points with devices for bending and twisting the terminal loops for the heddles, which devices are mounted on the carriers and travel with the wire in a direction at right angles to its length during the twisting operation, and means mounted on the carriers for holding the wire ends while the loops are being twisted.

5. A heddle making machine, comprising a series of rotary carriers for gripping and moving the wire sections at right angles to their length, said carriers being provided with central devices for opening the duplex wire and twisting the same to form the central eye, and said carriers being also provided on opposite sides of the center with devices for bending and twisting the terminal loops for the heddles, both the eye-forming and loop-forming devices being mounted on the carriers and arranged to travel with the wire in a direction at right angles to its length during the eye and loop forming operation.

6. A heddle making machine, comprising a series of rotary carriers for gripping and moving the wire sections at right angles to their length, said carriers being provided with central devices for opening the duplex wire and twisting the same to form the central eye, and said carriers being also provided on opposite sides of the center with devices for bending and twisting the terminal loops for the heddles, both the eye-forming and loop-forming devices being mounted on the carriers and arranged to travel with the wire in a direction at right angles to its length during the eye and loop forming operations, and means mounted on the carriers for gripping and holding the wire on opposite sides of its central eye and also adjacent to the end loops.

7. A heddle making machine, comprising a series of rotary carriers for gripping and moving the wire sections at right angles to their length, said carriers being provided with central devices for punching the duplex wire and twisting the same to form the central eye, which devices are mounted on the carriers and travel with the wire in a direction at right angles to its length during the twisting operation, said punching and twisting devices consisting of a stationary circular toothed gear and a pinion meshing therewith and rotated by travel thereover and having a central wire seat with punch, said pinion being arranged to revolve as it traverses the stationary gear.

8. A heddle making machine, comprising a series of rotary carriers for gripping and moving the wire sections at right angles to their length, said carriers being provided with central devices for punching the duplex wire and twisting the same to form the central eye, which devices are mounted on the carriers and travel with the wire in a direction at right angles to its length during the twisting operation, said punching and twisting devices consisting of a stationary circular toothed gear and a pinion meshing therewith and rotated by travel thereover and having a central wire seat with punch, said pinion being arranged to revolve as it traverses the stationary gear, and a vibrating anvil support for the wire during punching, said anvil being arranged to swing into range of coöperation with the punch and then move back from the carrier.

9. A heddle making machine, comprising a series of rotary carriers for gripping and moving the wire sections at right angles to their length, said carriers being provided with central devices for punching the duplex wire and twisting the same to form the central eye, which devices are mounted on the carriers and travel with the wire in a direction at right angles to its length during the twisting operation, said punching and twisting devices consisting of a stationary circular toothed gear and a pinion meshing therewith and rotated by travel thereover and having a central wire seat with punch, said pinion being arranged to revolve as it traverses the stationary gear, and a vibrating anvil support for the wire during punching, said anvil being arranged to swing into range of coöperation with the punch and then move back from the carrier, said anvil being made with two spring yielding sections adapted to receive between them the penetrating end of the punch.

10. A heddle making machine, comprising a series of rotary carriers for gripping and moving the wire sections at right angles to their length, said carriers being provided at two points with devices for bending and twisting the terminal loops of the heddles, which devices are mounted on the carriers and travel with the wire in a direction at right angles to its length and consisting of a head with a movable loop-forming device, a pinion carrying said head and a stationary circular toothed gear with which the pinion engages and by which it is rotated in its travel over the same.

11. A heddle making machine, comprising a series of rotary carriers for gripping and moving the wire sections at right angles to their length, said carriers being provided at two points with devices for bending and twisting the terminal loops of the heddles which devices are mounted on the carriers and travel with the wire in a direction at right angles to its length and consisting of a head with a movable loop-forming device, a pinion carrying said head and a stationary circular toothed gear with which the pinion engages and by which it is rotated in its travel over the same, and a gripping die for each twisting head also mounted on the carrier and moving with it to hold the doubled end of the wire.

12. A heddle making machine, comprising a series of rotary carriers for gripping and moving the wire sections at right angles to their length, said carriers being provided at two points with devices for bending and twisting the terminal loops of the heddles, which devices are mounted on the carriers and travel with the wire in a direction at right angles to its length and consisting of a head with a movable loop-forming device, a pinion carrying said head and a stationary circular toothed gear with which the pinion engages and by which it is rotated in its travel over the same, and a gripping die for each twisting head also mounted on the carrier and moving with it to hold the doubled end of the wire, said gripping die being formed at its biting faces with an offset to bring the bent and looped end of the wire into approximate coaxial alinement with the main body of the wire.

13. A heddle making machine, comprising a series of rotary carriers for gripping and moving the wire sections at right angles to their length, said carriers being provided at two points with devices for bending and twisting the terminal loops of the heddles, which devices are mounted on the carriers and travel with the wire in a direction at right angles to its length and consisting of a head with a movable loop-forming device, a pinion carrying said head and a stationary circular toothed gear with which the pinion engages and by which it is rotated in its travel over the same, said head being provided with a movable loop-forming pin and a loop bending die, and a movable member mounted on another portion of the machine and arranged to act upon the loop bending die to cause it to bend the wire around the loop forming pin.

14. A heddle making machine, comprising an intermittent feed for the wire, devices for cutting the wire into sections during the cessation of its feed, and a carrier for gripping the cut wire sections and moving the same laterally, and means mounted on the carrier for punching, bending and twisting each wire section into a heddle during its lateral travel.

15. A heddle making machine, comprising a series of rotary wire carriers for gripping and moving the wire sections laterally, punching, bending and twisting devices mounted on the carriers and arranged to perform their functions during the travel of the carriers, and endless chains for receiving the completely bent heddles arranged to move in a direction at right angles to the wire.

16. A heddle making machine, comprising a series of rotary wire carriers for gripping and moving the wire sections laterally, punching, bending and twisting devices mounted on the carriers and arranged to perform their functions during the travel of the carriers, endless chains for receiving the completely bent heddles arranged to move in a direction at right angles to the wire, stationary soldering baths arranged in the paths of the twisting portions of the wire, and means for dipping the heddles into the same.

17. A heddle making machine, comprising a series of rotary wire carriers for gripping and moving the wire sections laterally, punching, bending and twisting devices mounted on the carriers and arranged to perform their functions during the travel of the carriers, endless chains for receiving the completely bent heddles arranged to move in a direction at right angles to the wire, stationary chemical baths and stationary soldering baths, both arranged in the paths of the twisted portions of the wire, and means for dipping the heddles successively into the same.

18. A heddle making machine, comprising a series of rotary wire carriers for gripping and moving the wire sections laterally, punching, bending and twisting devices mounted on the carriers and arranged to perform their functions during the travel of the carriers, endless chains for receiving the completely bent heddles arranged to move in a direction at right angles to the wire, said chains being formed with fingers, the outer ends of which receive the heddles between them and the inner ends of which form gear-engaging teeth, and sprocket wheels engaging these teeth.

19. A heddle making machine having at its discharge end means for transporting the heddles laterally at right angles to their length, parallel guides for the loop ends of the heddles, stop devices at the ends of the guides, and pointed storage rods arranged adjacent the stop devices to penetrate the loops of the heddles and string the same in convenient condition for storage and transfer.

20. In a heddle making machine, the wire cutting devices comprising a rotating disk 15 with a plurality of tappets 56, the lever 67 arranged to be successively operated upon by the travel of the tappets, a vibrating knife 214 with spring for holding the same elevated, said knife being operated upon by the outer end of lever 67, and a block with wire channel through the same below the knife.

21. In a heddle making machine, the central eye-forming devices, consisting of the forked support with two sets of spring clamping jaws and an intermediate rotary member formed with a radial slot to receive the wire, and having a toothed pinion adapted to be rotated by travel over stationary gear teeth, and punching devices arranged on said rotary member.

22. In a heddle making machine, the central eye-forming devices, consisting of a rotary pinion chambered on one side and formed with a radial slot, two pairs of clamps, one pair of which protrude into the chamber of the pinion, and punching devices rotating with the pinion.

23. In a heddle making machine, the combination with an upright vibratory anvil member made in two parts adapted to spring apart; of a central eye punching and twisting device consisting of a rotary member having a radial wire seat, a lever 90 fulcrumed to the same and bearing a punch, and means for holding the punch in its position in the eye.

24. In a heddle making machine, the combination with an upright vibratory anvil member made in two parts adapted to spring apart; of a central eye punching and twisting device consisting of a rotary member having a radial wire seat, a lever 90 fulcrumed to the same and bearing a punch and means for holding the punch in its position in the eye, and means for adjusting the punch to the accurate registration with the space between the two members of the anvil.

25. In a heddle making machine, the means for forming and disengaging the loop, consisting of a twisting finger with laterally movable loop-forming pins, a two-part die, means for reciprocating it, means for imparting a travel to it around the pin, and means for moving the pin out of the loop.

26. In a heddle making machine, the means for forming and disengaging the loop, consisting of a twisting finger 45 arranged to turn about its longitudinal axis and having a cam groove 55, a laterally playing loop pin 49 with head 50 and spring 53, dies for forming the loop around the pin guided by said cam groove, and means acting upon the pin head to withdraw the pin from the loop.

27. In a heddle making machine, the means for forming and disengaging the loop consisting of a twisting finger 45 arranged to turn about its longitudinal axis and having cam groove 55, a laterally playing loop pin 49 with head 50 and spring 53, dies for forming the loop around the pin guided by said cam groove, means acting upon the pin head to withdraw the pin from the loop, and a guide 55ª for directing the wire around the pin.

28. In a heddle making machine, the combination with a revolving disk carrying the twisting fingers, each finger having a movable pin for forming the loop and a head; of a stationary member having a wedge-shape cam arranged in the travel of the disk to act upon the pin head and withdraw the pin from the loop.

29. In a heddle making machine, the combination with a revolving disk; of a device mounted thereon for forming the central eye of the heddle consisting of a rotary pinion having a radial wire seat, a punch and a lever carrying the same, an independently mounted spring bolt and means for drawing it back and releasing it to act upon the lever and withdraw the punch from the central eye of the heddle.

30. In a heddle making machine, the means for transferring the wire to the twisting carriers, consisting of a gear wheel 14 with interrupted teeth, a shaft 122 having oscillating toothed sector 123 meshing alternately with the interrupted gear and transferring arm 126 with jaws 129, and means for turning the shaft backward after being advanced by the gears.

31. In a heddle making machine, the combination with the loop bending and twisting devices; of a rotating disk having a series of gripping dies for holding the wire while the loops are being twisted, each of said dies consisting of a member rigidly fixed on the disk, a member pivoted to the disk and projecting therefrom, a spring for bringing the movable die member against the stationary die member, and a separately mounted tappet arm for opening the movable die member by the revolution of the disk.

32. In a heddle making machine, the combination with the loop bending and twisting devices; of a rotating disk having a series of gripping dies for holding the wire while the loops are being twisted, each of said dies consisting of a member rigidly fixed on the disk, a member pivoted to the disk and projecting therefrom, a spring for bringing the movable die member against the stationary die member, and a separately mounted tappet arm for opening the movable die member by the revolution of the disk, said die members being formed with offset seats 74 and 80 to bend the wire laterally to receive the return end of the loop.

33. In a heddle making machine, the combination with a heddle-twisting mechanism constructed as a rotary carrier moving the heddles laterally; of a pair of endless belts receiving the heddles, and a relatively stationary soldering bath through which the heddles are carried by the belt.

34. In a heddle making machine, the combination with a heddle-twisting mechanism constructed as a rotary carrier moving the heddles laterally; of a pair of endless belts receiving the heddles, and a relatively stationary soldering bath through which the heddles are carried by the belt, said endless belts being constructed as chains with pins, the outer ends of which receive the heddles and the inner ends of which form grappling teeth, and sprocket wheels engaging the same.

35. In a heddle making machine, the combination with the twisting mechanism; of a soldering mechanism consisting of endless belts carrying the heddles, rollers arranged one above and the other below the plane of the belts, a chemical bath arranged below the rollers and transferring its contents to the same, and a relatively stationary soldering bath with guides for carrying the heddles down into the same.

36. In a heddle making machine, the combination with endless heddle-carrying belts; of guides for the ends of the heddle loops, stops arranged above the path of the heddles, and two pointed stringing rods arranged at the ends of the guides and inside the stops to receive the heddle loops.

37. In a heddle making machine, the combination with a rotating heddle forming carrier; of a vibrating transfer arm 127 with wire gripping jaws 129, and a heddle wire guide composed of two members 219 and 220 having inclined upper flanges opening laterally and upwardly to correspond to the radial swing of the transfer arm.

38. In a heddle making machine, the combination with the wire cut-off devices; of two wire guides, each open at its upper side and provided with a removable cover 218, and friction feed wheels arranged between the guides.

CHARLES BEN BORGESON.

Witnesses:
   CHAS. T. AMY,
   W. T. MITCHELL.